US007652965B2

(12) United States Patent
Watabe

(10) Patent No.: US 7,652,965 B2
(45) Date of Patent: Jan. 26, 2010

(54) METHOD AND APPARATUS FOR OPTICAL INFORMATION RECORDING CAPABLE OF PRECISELY CONTROLLING LASER LIGHT EMISSION

(75) Inventor: Teruyasu Watabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 681 days.

(21) Appl. No.: 11/229,727

(22) Filed: Sep. 20, 2005

(65) Prior Publication Data
US 2006/0067706 A1 Mar. 30, 2006

(30) Foreign Application Priority Data
Sep. 24, 2004 (JP) ............................. 2004-277410

(51) Int. Cl.
*G11B 7/00* (2006.01)
(52) U.S. Cl. .................................................. 369/59.11
(58) Field of Classification Search ............... 369/59.11
See application file for complete search history.

(56) References Cited

U.S. PATENT DOCUMENTS 5,732,062 A * 3/1998 Yokoi et al. ................. 369/116
6,614,739 B1 * 9/2003 Sasaki et al. ................ 369/59.1
2002/0021642 A1 * 2/2002 Sasaki et al. ............. 369/59.11
2002/0085470 A1 7/2002 Yokoi
2003/0185126 A1 * 10/2003 Hishiyama ............... 369/53.26
2004/0008601 A1 1/2004 Sasaki et al.
2004/0047263 A1 * 3/2004 Xang et al. ............... 369/53.26
2005/0169148 A1 * 8/2005 Noguchi et al. .......... 369/59.11

FOREIGN PATENT DOCUMENTS

JP 2001-67669 3/2001
JP 2002-163824 6/2002
JP 2004-246935 9/2004

* cited by examiner

Primary Examiner—Wayne R Young
Assistant Examiner—Adam R Giesy
(74) Attorney, Agent, or Firm—Dickstein Shapiro LLP

(57) ABSTRACT

This patent specification describes a novel optical information recording method for recording mark and space information. The method for recording optical information comprises the steps of generating a peak level current waveform having a high level, generating a bias level current waveform having a low level generating a normal boost level current waveform and a low boost level current waveform, driving a laser light source with the normal boost level current waveform superimposed on the low level current waveform in a normal boost level light emission and switching a drive current waveform for the laser light source to the low boost level current waveform superimposed on the low level current waveform in a peak level sampling operation.

13 Claims, 8 Drawing Sheets

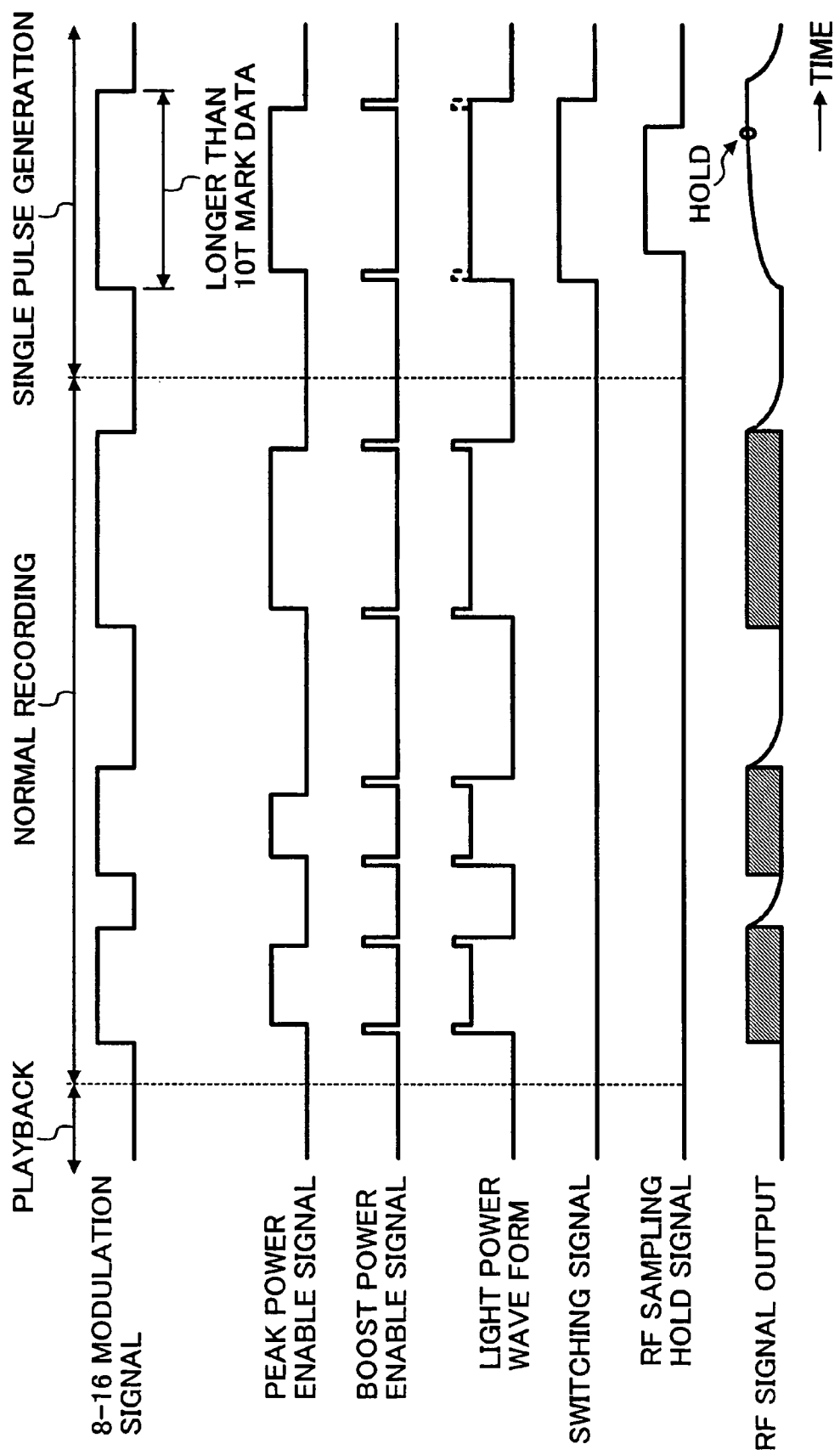

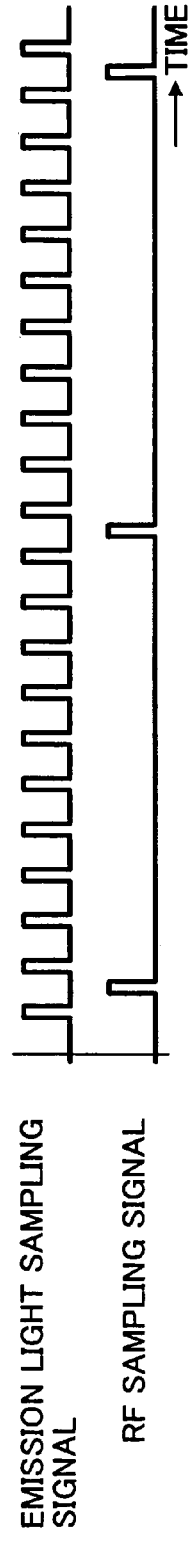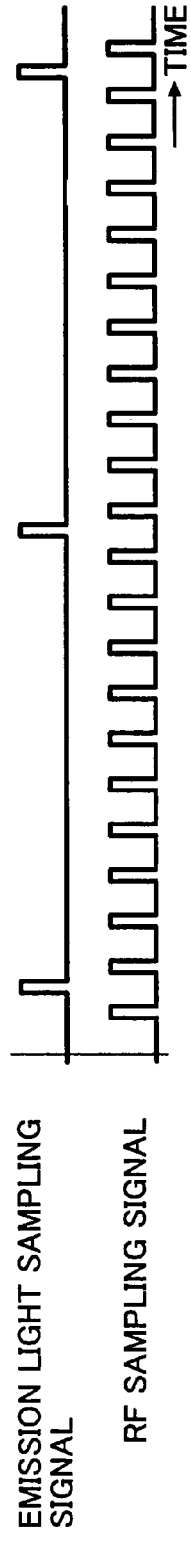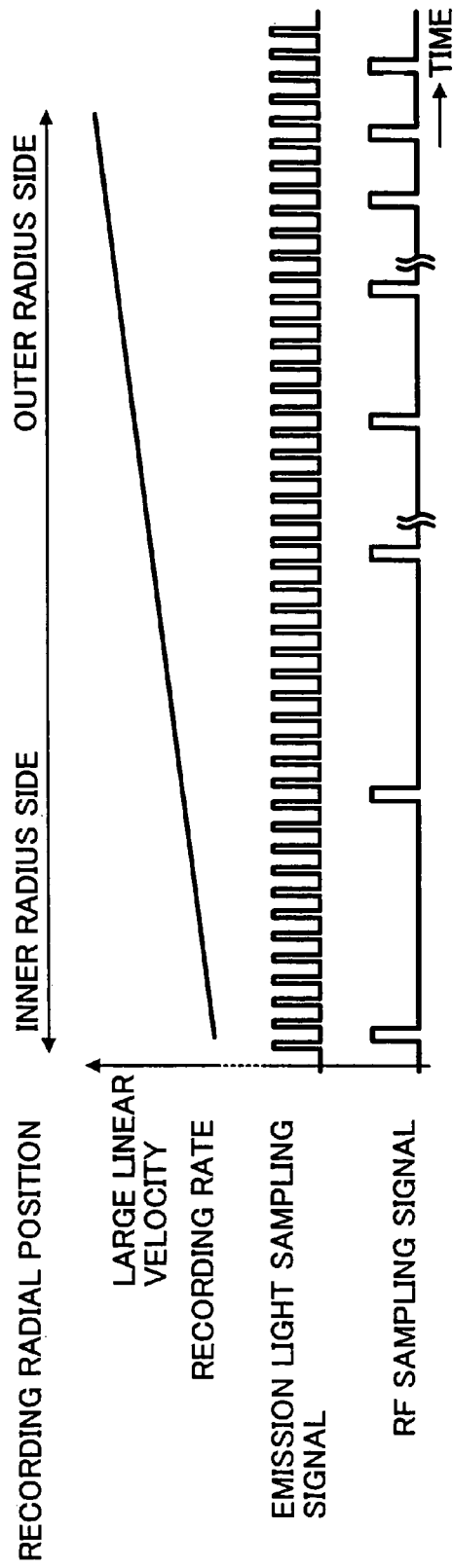

METHOD AND APPARATUS FOR OPTICAL INFORMATION RECORDING CAPABLE OF PRECISELY CONTROLLING LASER LIGHT EMISSION

This patent specification is based on Japanese patent applications, No. 2004-277410 filed on Sep. 24, 2004 in the Japan Patent Office, the entire contents of which are incorporated by reference herein.

BACKGROUND OF THE INVENTION

1. Field of the Invention

The present invention relates to a method and apparatus for recording optical information, and more particularly to a method and apparatus for recording optical information capable of precisely controlling emission of laser light for recording.

2. Discussion of the Background

According to a recent spread usage of multimedia, optical readable disks and their associated recording and playback apparatus have been developed rapidly in addition to an increase use of those dedicated to playback mediums such as music CDs, CD-ROMs and DVD-ROMs. More specifically, write-once optical disks using a dye recording medium and phase-change optical disks using phase-change medium have been developed. In these apparatuses, a semiconductor laser light (LD) is commonly used to playback and record.

FIG. 1 illustrates a signal set of a channel clock, recording data and a LD waveform generated through a recording operation performed by a background optical information recording apparatus.

One example recording waveform for applying power to the LD to record information on the dye recording medium is a single pulse waveform created based on eight-to-fourteen Modulation (EFM), as shown in FIG. 1. The single pulse waveform, however, is apt to generate distortions such that recorded marks are rounded due to accumulated heat during a time of recording. Consequently, the recording quality is decreased by these unsharpened recorded marks.

FIG. 2 is an illustration of another signal set of a channel clock, a modulation signal and a light waveform to explain advanced waveforms. This signal set represents one example waveform strategy for LD emission to record information on the dye recording medium. Such waveform strategy uses multi pulses based on recording data with eight-to-sixteen (8-16) modulation code to form marks. Recently, faster linear velocity for recording has been required and, as a result, it becomes increasingly difficult to make the LD responds to such a high speed operation as the multi pulse laser light emission. For this reason, a so-called "Castle write Strategy" waveform is proposed. The so-called "Castle write Strategy" waveform includes peak levels at both rising and failing edges of a pulse to emphasize the mark edges. The peak levels are generated by superimposing a power having a predetermined level on a single pulse at its rising and failing edges. A resultant superimposed peak level is called as a boost level.

FIG. 3 is an illustration to explain changes of the emission power due to changes of the LD drive current. When the dye recording medium and the phase-change optical medium are recorded, a control of a light emission power is precisely needed because characteristics of drive current versus light emission power (i.e., an I-L curve) may drift with heat generated by the LD itself. To make the light emission power stable, a method called automatic power control (APC) is widely used. In the APC, a part of a laser beam emitted from the LD is detected by a photo detector (PD) and then the LD drive current is controlled by a monitor current generated by the PD, which is proportional to the LD emission power.

In a playback operation, a high frequency current is generally superimposed on the LD drive current to reduce electric noises. In this case, a simple configuration of a feedback loop circuit of a low band path can be used to implement the APC because the high frequency current is substantially constant from a viewpoint of a DC current. However, the LD emission power for recording, which changes at an extremely high frequency to form mark/space, needs to be adjusted in a more accurate manner, when the APC is implemented in a recording operation. Therefore, further improvements on the control sequence are strongly requested. The LD drive current can be controlled to some degree with a relatively simple circuit configuration using a fact that a digital sum value (DSV) becomes zero in CDs and DVDs. However, it is almost not possible to precisely control the recording power by such a relatively simple circuit configuration.

For example, when a longest data length, i.e., 11-T mark and space is recorded on a CD-R medium with the writing strategy shown in FIG. 1, a sample hold circuit may be used to keep emission power. Using the sample hold circuit, a few MHz of frequency band may be enough to control even if a rotating speed of the recording medium increases up to four times faster. Thus, the relatively cheap circuit may be able to control the recording power.

During the recording operation, a laser wave length and a sensitivity at the position of the recording disk surface may change due to the increase of temperature in the apparatus and the changes affect suitable recording power of the LD. Therefore, a so-called Running OPC (Running Optimum Power Calibration) is used to adjust recording power in accordance with a level of reflected light (i.e., RF signal) detected during the recording operation.

FIG. 4 is an illustration to explain a problem caused when the reflected light is detected. A reflection rate of the reflected light at a recorded spot rapidly decreases soon after the spot is exposed by the laser beam. The RF signal is high at the rising edge of the pulse and is decreasing to low at falling edge of the pulse, as shown in FIG. 4. To detect the RF signal properly, sampling may be performed at the last part of the pulse where the pulse becomes relatively stable.

However, in a case of a high speed recording on the dye type DVD medium with the so-called "Castle write Strategy" waveform, it is difficult to perform sampling of a peak level at a center of the pulse using a relatively simple sample hold circuit. More specifically, a photo detecting mechanism and assistant circuits following to the photo detecting mechanism need to have very high performance with respect to a control band. Accordingly, the cost of the circuits is high.

SUMMARY OF THE INVENTION

This patent specification describes a novel optical information recording apparatus for recording mark/space information. The optical information recording apparatus comprises a peak level current drive circuit configured to generate a peak level current waveform having a high level, a bias level current drive circuit configured to generate a bias level current waveform having a low level, a boost level drive current circuit configured to generate a normal boost level current waveform and a low boost level current waveform and a drive current circuit configured to drive a laser light source with the high level current waveform superimposed on the low level current waveform in a peak level light emission, the normal boost level current waveform superimposed on the low level current waveform in a normal boost level light emission, and the low boost level current waveform superimposed on the low level current waveform in a peak level sampling operation.

This patent specification further describes a novel optical information recording apparatus in which the boost level drive current circuit includes a switching circuit configured to switch between the normal boost level current waveform and the low boost level current waveform.

Further, this patent specification describes a novel method for recording mark and space information comprises the steps of generating a peak level current waveform having a high level, generating a bias level current waveform having a low level generating a normal boost level current waveform and a low boost level current waveform, driving a laser light source with the normal boost level current waveform superimposed on the low level current waveform in a normal boost level light emission and switching a drive current waveform for the laser light source to the low boost level current waveform superimposed on the low level current waveform in a peak level sampling operation

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a time chart to explain different relationships among signals used by the optical information recording apparatus of FIG. 5; and FIGS. 11, 12 and 13 are time charts to explain relationships between sampling frequencies used by the optical information recording apparatus of FIG. 5.

DETAILED DESCRIPTION OF PREFERRED EMBODIMENTS

Figures 1, 2:
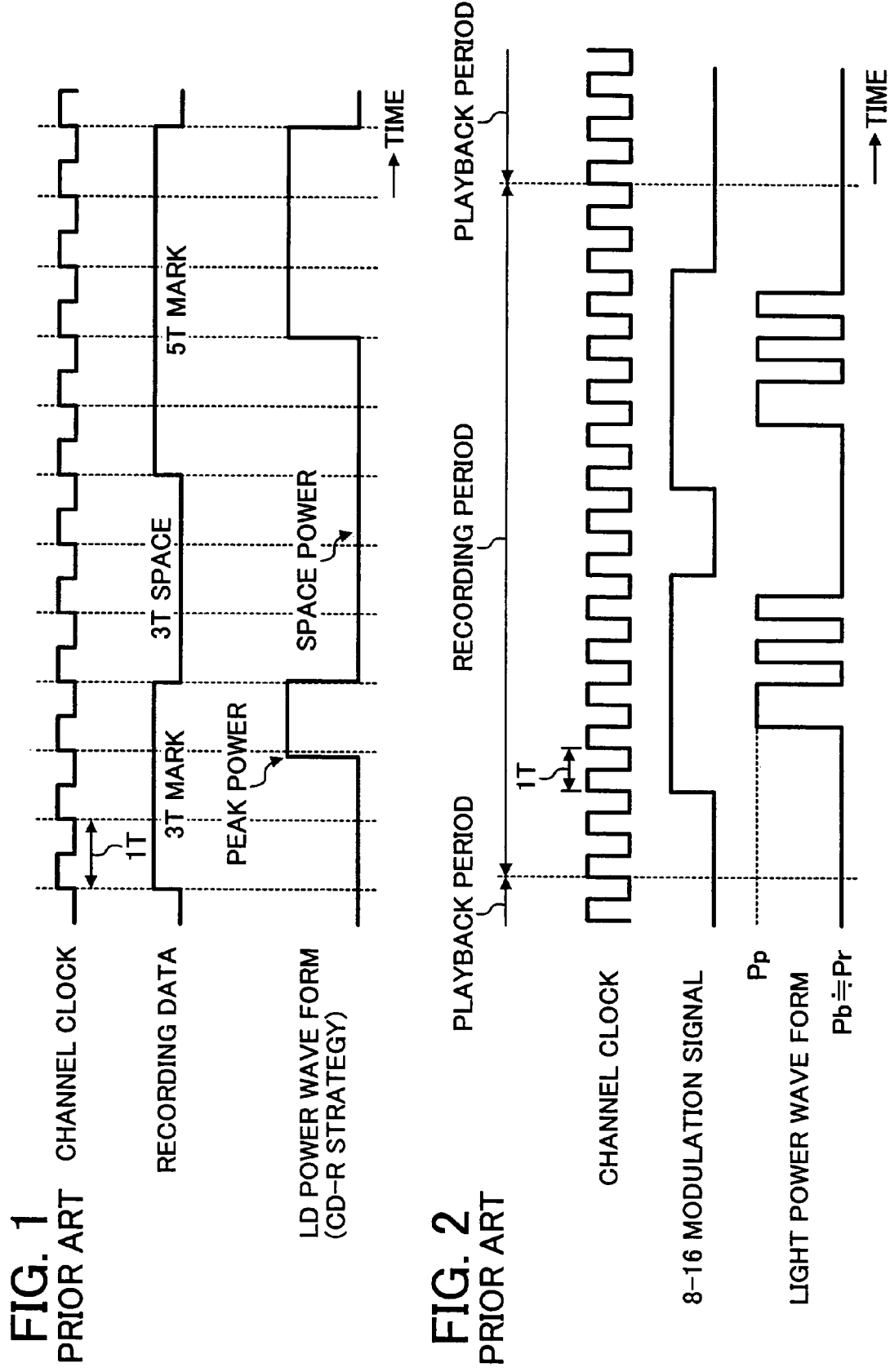
FIG. 1 illustrates conventional LD waveforms for recording optical information.
FIG. 2 is an illustration to explain advanced LD waveforms for recording optical information.
Figure 3:
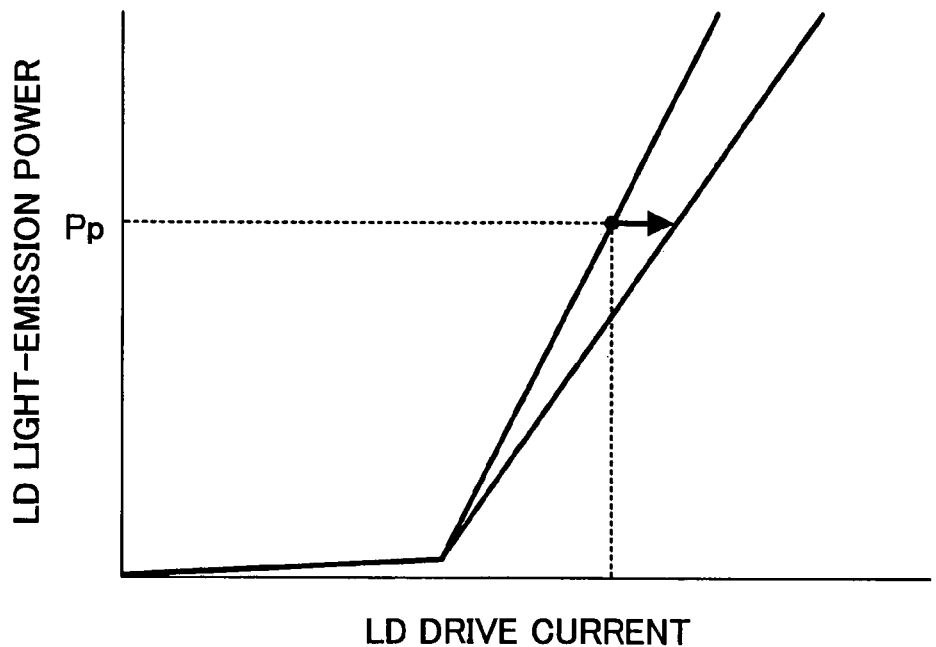
FIG. 3 is an illustration to explain a relationship between an emission power and an LD drive current.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 5 and 6, a LD power control apparatus according to an embodiment of the present invention is described.

Figure 5:
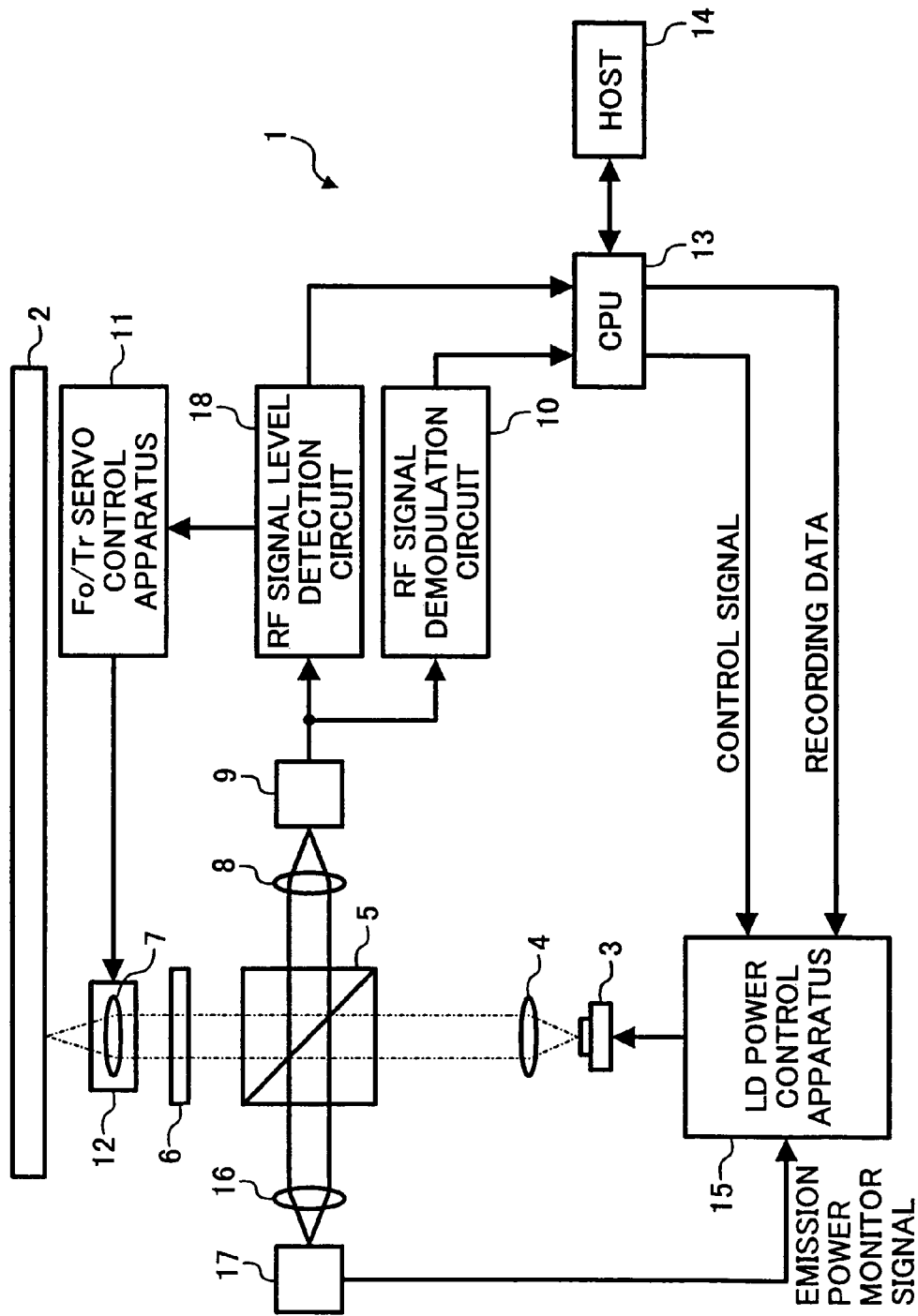
FIG. 5 illustrates a basic configuration of an optical information recording apparatus according to an example embodiment of the present invention.

FIG. 5 illustrates a basic configuration of an optical information recording apparatus 1. The optical information recording apparatus includes a recording medium 2, a semiconductor laser diode (LD) 3, a collimator lens 4, a polarizing beam split 5, a quarter-wavelength ($\lambda/4$) plate, an object lens 7, a detection lens 8, a divided light-sensitive element 9, a RF signal demodulation circuit 10, a Fo/Tr servo-control apparatus 11, an actuator 12, a central processing unit (CPU) 13, a host computer 14, a semiconductor laser diode (LD) power control apparatus 15, a converging lens 16, a front photo detector (PD) 17 and a RF signal demodulation circuit 18.

In this embodiment, code data with DVD format is recorded on a dye type recording medium such as write once DVD+R disk. And a mark edge recording method which is a pulse width modulation (PWM) is used with 8-16 modulation codes as a data modulation method. Mark/space information is recorded onto the recording medium with laser beam with multi pulses emission in accordance with a predetermined emission rule for the LD 3.

In the optical information recording apparatus 1, the LD 3 is used as an emission source of the laser beam to record on the recording medium 2. The recording medium 2 is driven to rotate by a spindle (not shown). The laser beam emitted from the LD 3 is passing through collimator lens 4 and is converted to parallel pencil. The converted laser beam, which is passing through the polarizing beam split 5, the one quarter-wavelength ($\lambda/4$) plate and the object lens 7, is then focused and is exposed to the recording medium 2. The returning beam reflected from the recording medium 2 is passing again through the object lens 7 and the one quarter-wavelength ($\lambda/4$) plate. Then, the returning beam enter the polarizing beam split 5 with the 90 degree rotation of polarizing direction and is reflected and is passing through the detection lens 8. Finally, the reflected beam enters the divided light-sensitive element 9 which is divided into four segments of a detection area and is detected.

Signals generated from the detected light at the four segments of the detection area are bases to generate signals such as a RF signal, a servo signal Fo for focusing and a servo signal Tr for tracking. The RF signal is input to the RF signal demodulation circuit 10 and is used to output a playback data as a playback signal. Meanwhile, the servo signal Fo for focusing and the servo signal Tr for tracking are input to the Fo/Tr servo control apparatus 11 and perform a control of the actuator for focusing and tracking the object lens 7 so that the laser beam to the recording medium 2 is accurately tracking on a track with a focused focal point.

The CPU 13 works as an arithmetic device and is arranged to capture the playback data from the RF signal demodulation circuit 10 and performs arithmetic and controlling processing. The host computer 14 is connected to the CPU 13 and controls to receive and transmit the playback data, recording data and other necessary signals. The LD power control apparatus 15 is also connected to the CPU 13 and controls the power and the condition of the LD 3 based on the playback data and the recording data. In this embodiment, the front photo detector (PD) 17 is arranged and is configured to detect a monitoring light. The monitoring light emitted from the LD 3 is reflected and is taking the separate path from outward path at the polarizing beam split 5. Then the monitoring light is going into PD 17 though the converging lens 16.

Moreover, the RF signal demodulation circuit 18 is arranged and is configured to detect a peak level of a RF signal which is output from the divided light-sensitive element 9 and to output the RF peak level signal to CPU 13.

Figure 6:
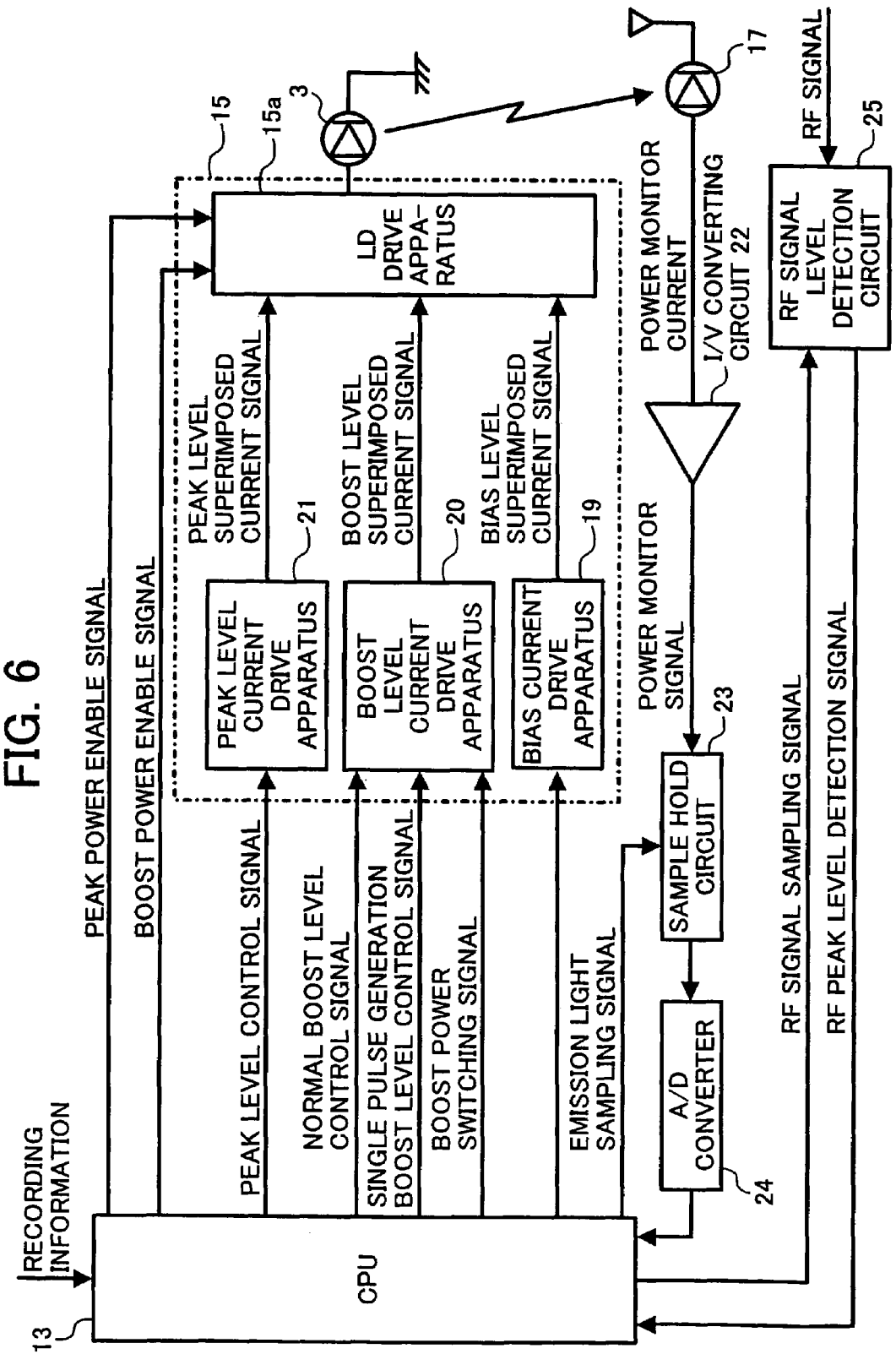
FIG. 6 is a block diagram of an LD power control apparatus and associated circuits included in the optical information recording apparatus of FIG. 5.

FIG. 6 is an illustration of the embodiment to explain the operation of the LD power control apparatus 15. The embodiment includes a bias level current drive apparatus 19, a boost level current drive apparatus 20, a peak level current drive apparatus 21, an I/V converting circuit 22, a sample hold circuit 23 and an A/D converter 24. The LD power control apparatus 15 includes a LD drive apparatus 15a which feeds drive current to the LD 3.

Figure 4:
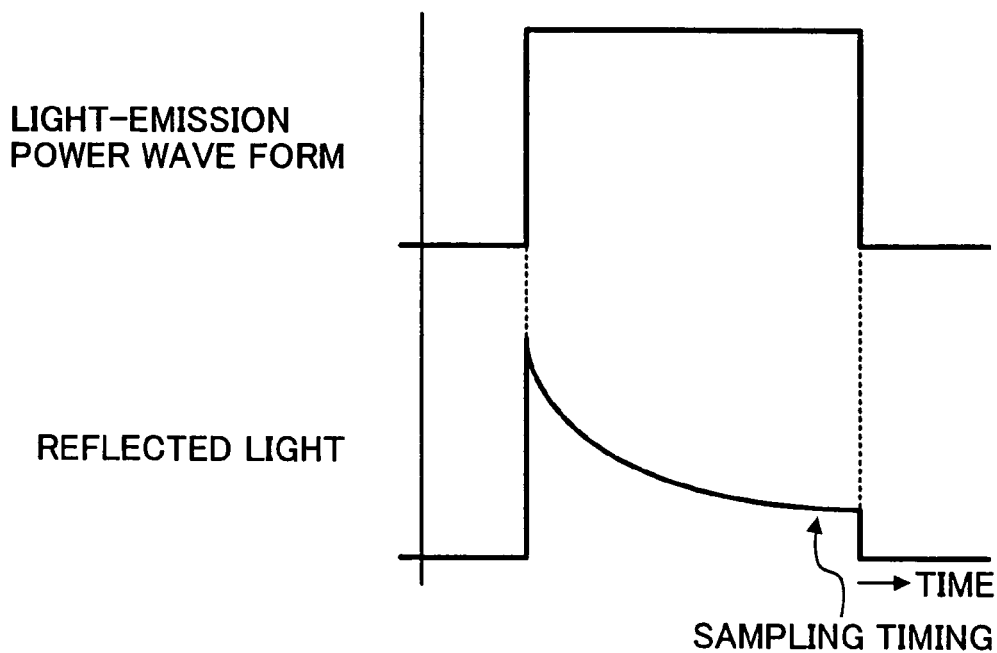
FIG. 4 is an illustration to explain a problem when a reflected light is detected.

In this configuration, it is needed to have three powers such as a peak power Pp to form marks with so-called "Castle Write Strategy" waveform shown in FIG. 4, a boost power Pbstn to boost the start and the end of the power pulse and a bias power (bottom power) Pb. For this reason, a bias level current drive apparatus (bias level current applying device) 19, a peak level current drive apparatus 21 and a boost level current drive apparatus 20 are arranged as front circuits to the LD drive apparatus 15a.

The bias level current drive apparatus 19 outputs a bias level drive current signal to the LD drive apparatus 15a. The peak level current drive apparatus 21 is specifically a Digital-to-Analog converter (D/A converter) and outputs an analog signal of a peak level superimposed current signal based on the LD drive current information set digitally by the CPU 13. The boost level current drive apparatus 20 outputs to the LD drive apparatus 15a with a boost level superimposed current signal which is to be superimposed on the bias level current. This will be described later.

The I/V converting circuit 22 is arranged and is configured to convert a power monitor current output from the PD 17 to a voltage signal. Sampling of the peak level power is performed by the sample hold circuit 23. A sampling signal is digitalized by the Analog-to-Digital converter (A/D converter) 24. Then, the voltage signal converted is output to the CPU 13.

Figure 7:
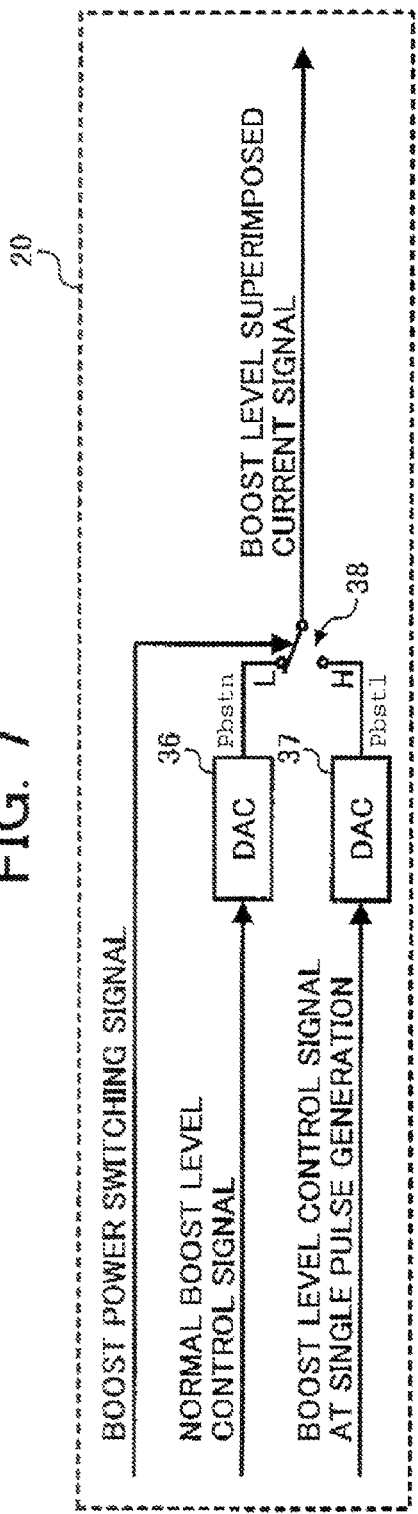
FIG. 7 is a block diagram of a boost level current drive apparatus included in the LD power control of FIG. 6.

FIG. 7 is an illustration of the embodiment to explain the operation of the boost level current drive apparatus 20. The boost level current drive apparatus 20 includes two Digital-to-Analog converters (D/A converter) 36, 37 and a switch 38. The boost level superimposed current is output to the LD drive 15a from one of D/A converters 36, 37 which is selected by the switch 38 in accordance with a peak level switching signal.

One of the D/A converters 36 is set to provide a normal boost level Pbstn in accordance with a normal boost level control signal from the CPU 13. If the LD 3 emits a laser beam with so-called "Castle Write Strategy" waveform, the switch 38 selects L side in accordance with a boost level switching signal.

Another D/A converter 37 is set to provide a predetermined boost level Pbstl in accordance with the single pulse generation boost level control signal from the CPU 13. A value of the predetermined boost level Pbstl can be taken from a high level down to a null level. If the LD 3 emits a laser beam with the predetermined boost level, the switch 38 selects the H side in accordance with the boost power switching signal.

With this configuration, a normal pulse waveform operation is described first. Values of the output current from the boost level current drive apparatus 20 and the peak level current drive apparatus 21 are determined, by the boost level control signal at normal or single pulse generation mode and the peak level control signal output from the CPU 13. The peak level current drive apparatus 21 outputs to the LD drive apparatus 15a with a peak level superimposed current signal which is an analog signal based on the information of the LD drive current set digitally by the CPU 13. The boost level current drive apparatus 20 outputs to the LD drive apparatus 15a with a boost level superimposed current signal. The bias level current drive apparatus 19 outputs to the LD drive apparatus 15a with a bias level drive current signal. The LD drive apparatus 15a determines the each current value for a bias power (bottom power) Pb and a peak power Pp and a boost power Pbstn in accordance with the bias level drive current signal, the peak level superimposed current signal and the boost level superimposed current signal.

Figure 8:
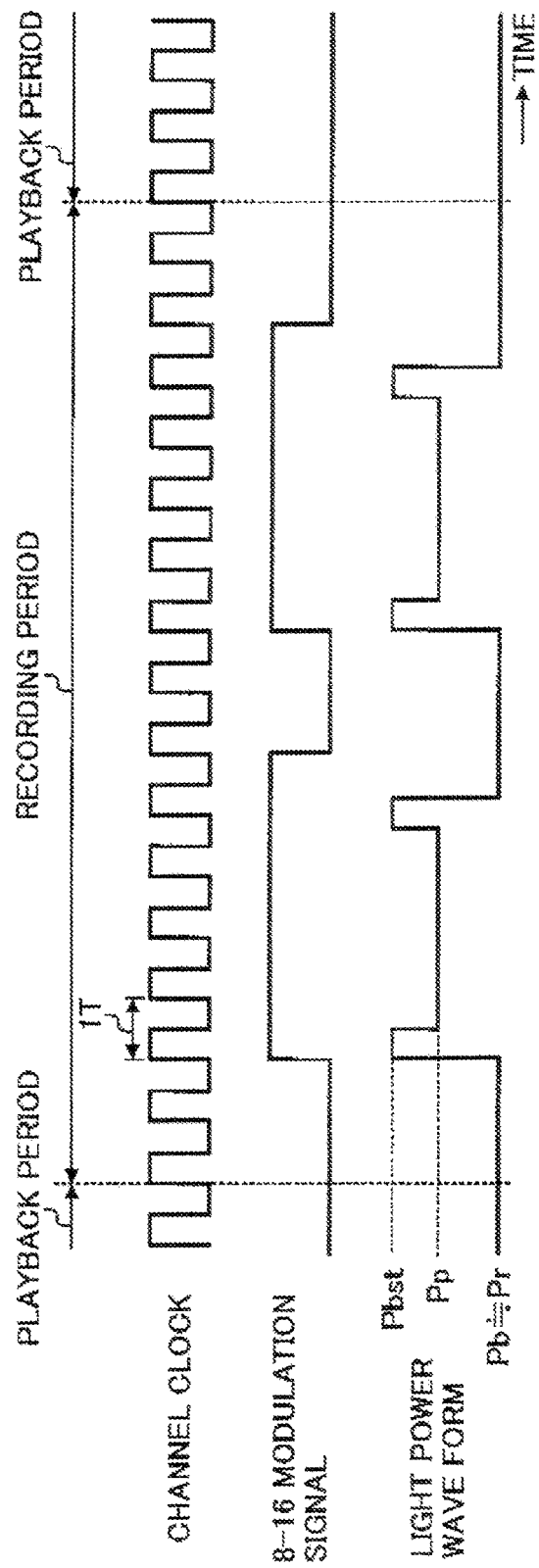
FIG. 8 is a time chart to explain a light power waveform having multi power levels.

FIG. 8 is an illustration to explain the LD drive signals. A channel clock signal, a modulation signal and a light power waveform are shown in FIG. 8. The CPU 13 converts the information to be recorded to a 8-16 modulation signal and generates a so-called "Castle Write strategy" light power waveform. In accordance with the light power waveform, the CPU 13 provides a peak power enable signal and a boost power enable signal to the LD drive apparatus 15a. When the boost power enable signal and the peak power enable signal are both 'H' level, the CPU 13 superimposes the superimposed current signals with the corresponding level on the bias level drive current signal and provides it to the LD 3.

Figure 9:
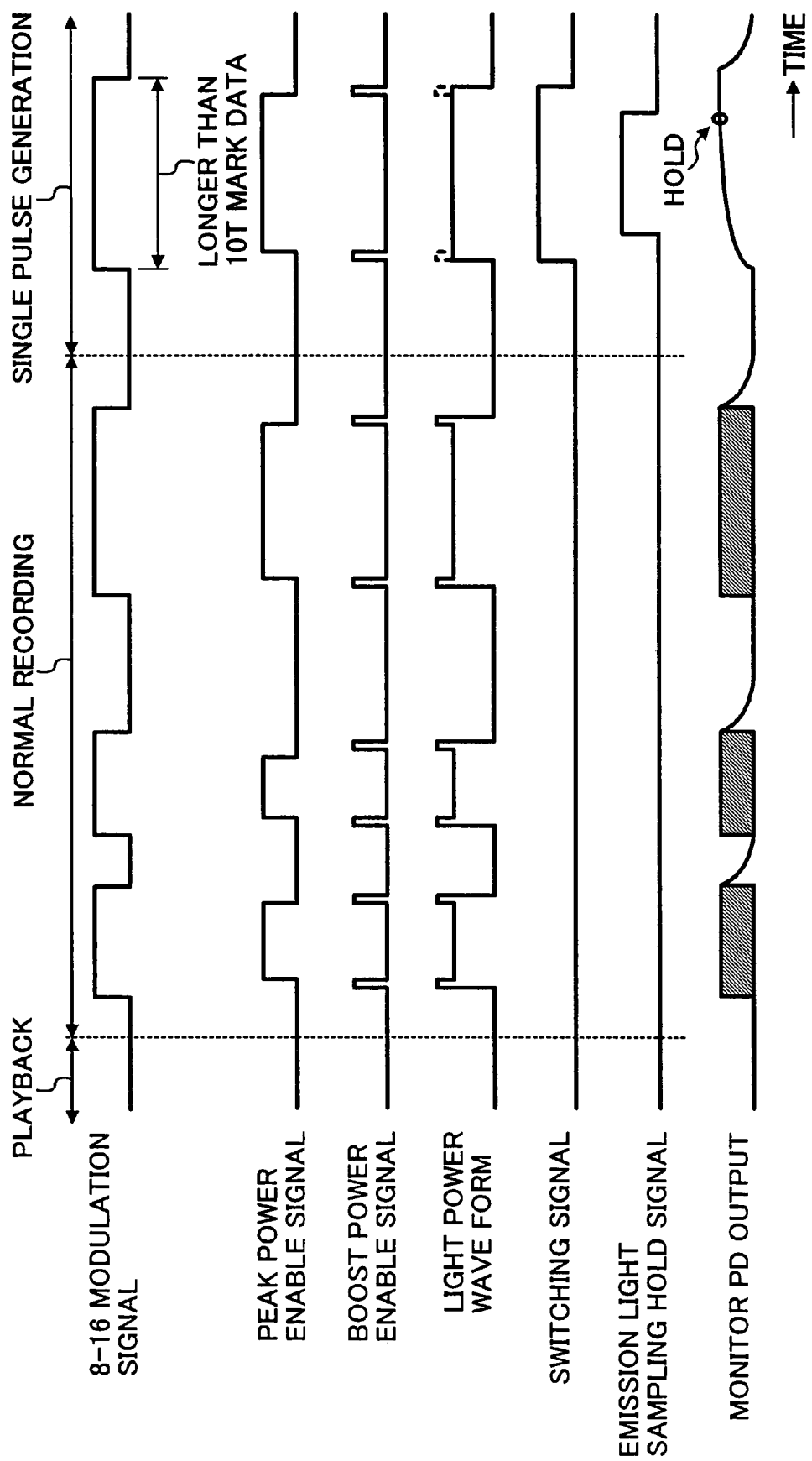
FIG. 9 is a time chart to explain relationships among signals used by the optical information recording apparatus of FIG. 5.

FIG. 9 is an illustration to explain the relation ship between the signals. A modulation signal, a peak power enable signal, a boost power enable signal, light power enable signal, a switching signal, sample hold signal and a monitor PD output signal are shown in FIG. 9. When the light emission is performed with a boost level, the boost power enable is set 'H' and the LD drive apparatus 15a superimposes the boost level superimposed current signal on the bias level current signal and provides it to the LD 3. When the light emission is performed with a peak level, the peak power enable is set 'H' and the LD drive apparatus 15a superimposes the peak level superimposed current signal on the bias level current signal and provides it to the LD 3.

When the LD drive apparatus 15a provides the drive current to the LD 3, the laser beam is emitted from the LD 3 and is exposed to the recording medium 2 to record the information. While recording, a part of the emission light is input to the PD 17 and a power monitor current proportional to the light emission power is output to the I/V converter circuit 22. The power level is detected using a power monitor current signal converted from current to voltage by the I/V converter circuit 22.

The so-called "Castle Write Strategy" waveform includes a plurality of peak levels as shown in FIG. 8. If a conventional sample hold circuit is used to perform sampling of the peak level, it is requested to take sampling timely at the center of the pulse, not for the boost level on the both edge of the pulse. However, it becomes difficult to take a sampling value just at the center of the pulse when the linear velocity at recording becomes high. Therefore, if sampling of a peak level of emission power waveform is performed, a single pulse is generated for a short period with a single pulse to take sampling value from the single pulse as shown in the right side of the FIG. 9. The boost level Pbstl in this operation may be same level as the peak level Pp.

This procedure having the single pulse generation period for sampling operation is applicable to two operations such as an APC operation which keeps LD emission level at the predetermined level and a Running OPC operation which keeps the recording quality of the medium constant. The CPU 13 sets parameters for the D/A converter 37 of the boost level current drive apparatus 20 so that the LD 3 emits at the peak level Pp in accordance with the single pulse operation boost level control signal.

Meanwhile, the CPU 13 sets the boost power switching signal 'H' to change the connection of the switch 38 during a predetermined period of the time (for example, longer than 10 T mark) so that the output of the D/A converter 37 becomes the superimposed current having boost level. At the same time, an emission light sampling hold signal is set 'H'. Then, during the time period of the appearance of the marks, Pbstl is Pp and the LD 3 emits a laser light with a single pulse of a constant power level Pp.

The peak level Pp is detected at the last part of the period even by a relatively rough setting of the emission light sampling hold signal. The CPU 13 is updating the peak level control signal so that the detected peak level is kept the predetermined peak level. Thus, this operation is repeated during a predetermined period of the APC cycle compensating the change of I/V characteristics so that the emission power level for the LD 3 is kept constant while recording. The time interval of the repetition frequency for the APC is defined as a first predetermined interval.

FIG. 10 is a similar illustration to FIG. 9 to explain the relation ship between the signals. A RF sample hold signal and a RF signal output are shown in FIG. 10. An appropriate repetition frequency for the APC control to achieve compensation for the change of the I/V characteristics is obtained by experiments in advance. The boost power switching signal is set 'H', only at the period of the appearance of the longer than 10 T mark in which sampling is performed. By this setting, the LD 3 is emitted with the so-called "Castle write strategy" method during the data writing except for the sampling period. Namely, the sampling does not affect the recording quality.

Meanwhile, at the Running OPC operation, a single pulse emission operation is performed at different repetition frequency from the repetition frequency for the APC to detect a peak level of RF signal. The time interval of the repetition frequency for the Running OPC is defined as a second predetermined interval.

The first predetermined interval and the second predetermined interval, more specifically APC control frequency and Running OPC control frequency, are to be set independently. Moreover, the APC operation works to maintain the power, on the other hand, the Running OPC works to renew the power. If the APC operation and the Running OPC operation are performed at similar interval, the apparatus may have a interfere problem among two operations and finally becomes uncontrollable. Therefore, the first and second predetermined intervals are requested to be different from each other in terms of the repetition frequency. And the one interval may need to be severalfold longer than the other interval.

FIG. 11, FIG. 12 and FIG. 13 are illustrations to explain the relationship between sampling frequencies. FIG. 11, for example, shows a case where an interval of the clock of APC control is a tenth part of an interval of the clock of Running OPC. The APC is performed more frequently comparing to the Running OPC so that the laser power is stably controlled to the setting power value. On that basis, the setting power value is renewed.

FIG. 12 illustrates another example on the contrary to FIG. 11. An interval of the clock of Running OPC is a tenth part of an interval of the clock of APC. In this embodiment, The Running OPC is performed more frequently comparing to the APC so that the setting power value is constantly controlled to keep recording quality. On that basis, the laser power is adjusted to I-L characteristics by the APC.

There is another example in which sampling frequency is changed in accordance with the change of the linear velocity of the recording. For example, a linear velocity at outer radius of the disk is faster than a linear velocity at inner radius of the disk when CAV method is used. When the linear velocity is fast, variations in the positions of the recording medium become larger. To reduce the variations, it is requested to perform Running OPC more frequently. For that reason, a frequency of the RF sampling signal is to be set higher in accordance with the increase of the linear velocity of the recording as shown in FIG. 13 to control the recording quality more accurately.

Numerous additional modifications and variations are possible in light of the above teachings. It is therefore to be understood that within the scope of the appended claims, the disclosure of this patent specification may be practiced otherwise than as specifically described herein.

What is claimed is:

1. An optical information recording apparatus, comprising:
a peak level current drive circuit configured to generate a peak level current waveform having a high level;
a bias level current drive circuit configured to generate a bias level current waveform having a low level which is lower than the high level;
a boost level drive current circuit configured to generate a normal boost level current waveform and a low boost level current waveform which has a lower boost level than a boost level of the normal boost level current waveform, the low boost level being greater than zero; and
a drive current circuit configured to drive a laser light source with the high level current waveform superimposed on the low level current waveform in a peak level light emission, the normal boost level current waveform superimposed on the low level current waveform in a normal boost level light emission, and the low boost level current waveform superimposed on the low level current waveform during a peak level sampling operation.

2. The optical information recording apparatus of claim 1, wherein the boost level drive current circuit includes a switching circuit configured with a switch that switches between the normal boost level current waveform and the low boost level current waveform.

3. The optical information recording apparatus according to claim 2, further comprising a high level control circuit configured to control the high level to a predetermined level by sampling a light amount emitted from the laser light source corresponding to the high level at a first predetermined interval after the switching circuit switches to the low boost level current waveform.

4. The optical information recording apparatus according to claim 2, further comprising a laser power control circuit configured to control a laser power to a predetermined level by sampling a light amount reflected from the recording medium at a second predetermined interval after the switching circuit switches to the low boost level current waveform.

5. The optical information recording apparatus according to claim 3, further comprising a laser power control circuit configured to control a laser power to a predetermined level by sampling a light amount reflected from the recording medium at a third predetermined interval after the switching circuit switches to the low boost level current waveform.

6. The optical information recording apparatus according to claim 5, wherein the first predetermined interval is at least three times as long as the third predetermined interval.

7. The optical information recording apparatus according to claim 5, wherein the third predetermined interval is at least three times as long as the first predetermined interval.

8. The optical information recording apparatus according to claim 2, wherein the switching circuit is further configured to switch from the normal boost level current waveform to the low boost level current waveform at a specific interval of a predetermined number of pulses formed by the normal boost level current waveform superimposed on the bias level current waveform.

9. The optical information recording apparatus according to claim 2, wherein the specific interval is changed in accordance with a linear velocity of the recording medium during a time the mark and space information is recorded on the recording medium.

10. The optical information recording apparatus according to claim 2, wherein the switching circuit is further configured to switch from the normal boost level current waveform to the low boost level current waveform during a time longer than a predetermined length in which a plurality of marks of the mark and space information are output.

11. An optical information recording apparatus, comprising:
   means for generating a peak level current waveform having a high level;
   means for generating a bias level current waveform having a low level which is lower than the high level;
   means for generating a normal boost level current waveform and a low boost level current waveform which has a lower boost level than a boost level of the normal boost level current waveform, the low boost level being greater than zero; and
   means for driving a laser light source with the high level current waveform superimposed on the low level current waveform in a peak level light emission, the normal boost level current waveform superimposed on the low level current waveform in a normal boost level light emission, and the low boost level current waveform superimposed on the low level current waveform during a peak level sampling operation.

12. The optical information recording apparatus of claim 11, wherein the boost level drive current mean includes a means for switching between the normal boost level current waveform and the low boost level current waveform.

13. A method for recording optical information, the method comprising the steps of:
   generating a peak level current waveform having a high level;
   generating a bias level current waveform having a low level which is lower than the high level;
   generating a normal boost level current waveform and a low boost level current waveform which has a lower boost level than a boost level of the normal boost level current waveform, the low boost level being greater than zero;
   driving a laser light source with the normal boost level current waveform superimposed on the low level current waveform in a normal boost level light emission; and
   switching a drive current waveform for the laser light source to the low boost level current waveform superimposed on the low level current waveform during a peak level sampling operation.

* * * * *

UNITED STATES PATENT AND TRADEMARK OFFICE
CERTIFICATE OF CORRECTION

PATENT NO.       : 7,652,965 B2
APPLICATION NO.  : 11/229727
DATED            : January 26, 2010
INVENTOR(S)      : Teruyasu Watabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this

Twenty-third Day of November, 2010

David J. Kappos
*Director of the United States Patent and Trademark Office*